No. 681,736. Patented Sept. 3, 1901.
A. ROSENTHAL.
CORN HUSKING MACHINE.
(Application filed Apr. 6, 1901.)
(No Model.)
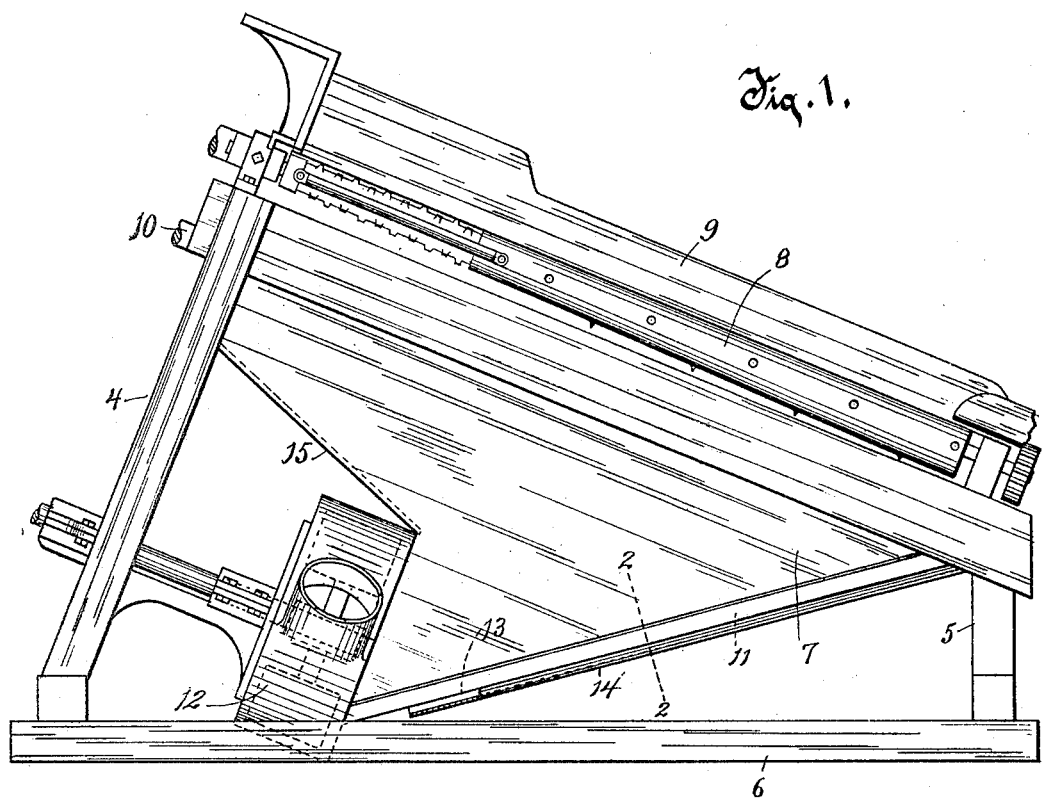
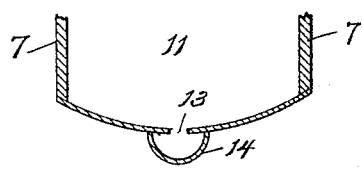

UNITED STATES PATENT OFFICE.

AUGUST ROSENTHAL, OF MILWAUKEE, WISCONSIN, ASSIGNOR TO ROSENTHAL HUSKER COMPANY, OF SAME PLACE.

CORN-HUSKING MACHINE.

SPECIFICATION forming part of Letters Patent No. 681,736, dated September 3, 1901.

Application filed April 6, 1901. Serial No. 54,763. (No model.)

*To all whom it may concern:*

Be it known that I, AUGUST ROSENTHAL, residing at Milwaukee, in the county of Milwaukee and State of Wisconsin, have invented a new and useful Improvement in Corn-Husking Machines, of which the following is a description, reference being had to the accompanying drawings, which are a part of this specification.

My invention has relation to improvements in corn-husking machines.

The primary object of the invention is to provide an improved means for separating the shelled corn from the shredded or cut stalks and husks, and with this in view the invention consists of the devices and parts or their equivalents, as hereinafter set forth.

In the accompanying drawings, Figure 1 is a side elevation of so much of a corn-husking machine as is necessary to illustrate my invention. Fig. 2 is a transverse section on the line 2 2 of Fig. 1, and Fig. 3 is a fragmentary plan view of the trough.

Any suitable form of framework may be provided, and in the accompanying drawings I show a form of frame in which the numeral 4 indicates one of the front uprights or legs, 5 one of the rear uprights or legs, said legs extending upwardly from a suitable base 6, and 7 the side boards of the frame. The front uprights or legs are considerably higher than the rear uprights, as is customary in this class of machines, so as to throw the frame on a decline from the front to the rear end thereof. In the upper portion of the frame are mounted the husking-rollers 8, which are of the usual and well-known form of construction. Above the rollers is the usual feed-hopper 9, while mounted in the framework below the rollers is a shaft 10, which carries the shredding or cutting mechanism. (Not shown.) As is well understood by those familiar with this class of machines, the cornstalks, with attached ears, are fed into the hopper 9, and from said hopper they pass to the rollers 8, which rollers act to separate the stalks from the ears, the separated stalks passing between the rollers. The said rollers also act to husk the ears, the husks passing between the rollers, while the ears, with the husks removed therefrom, are left on top of the rollers and slide down said rollers and off the rear ends thereof into a suitable receptacle. In the operation of husking the ears some of the kernels of the ears are frequently detached, and these shelled kernels pass between the rollers and are caught by the trough, which is provided to receive the shredded stalks and husks. It is the object of my invention to provide a means for separating from the shredded stalks and husks the kernels of corn so shelled and to prevent said kernels from being drawn into the fan-casing. To this end I provide an improved form of trough, (indicated by the numeral 11,) which trough is located beneath the shredding mechanism and is on the gradual decline from the rear end of the frame to a fan-casing 12, arranged at the forward end of the machine and with which casing it is in communication. The bottom of this trough is provided with a longitudinal slot 13, and on the under side of the trough and lengthwise of the slot is a small auxiliary trough 14. The slot 13 and trough 14 terminate a desired distance from the forward end of the main trough, said forward end of the main trough, as stated, being in communication with the fan-casing. It has been customary heretofore to provide a trough arranged similarly to the trough 11—that is to say, a trough leading to the fan-casing—and also an oppositely-inclined flooring 15, arranged beneath the receiving ends of the rollers and adapted to deposit the shredded husks into the trough, but this trough heretofore has not been provided with a slot 13 and auxiliary trough 14 therebeneath, and hence it has not been possible to separate any shelled corn which may pass between the rollers and be deposited in the trough from the shredded or cut stalks and ears, and therefore said shelled corn has been lost by being drawn into the fan-casing. By my improved construction the shelled kernels which may be deposited in the trough 11 pass through the slot 13 into the auxiliary trough 14 and are free to pass out of the forward discharge end of said auxiliary trough into a suitable receptacle, whereby all such shelled corn is not only saved, but is deposited in a receptacle practically free from dirt, as the action of the fan in the casing serves to draw all dirt or sediment with the shredded stalks and husks down the main trough 11 into the fan-casing. I prefer to make the slot 13 and the auxiliary trough 14 of a gradually-increasing width toward the forward end of the machine, thereby obviating all danger of clogging of the slot and the auxiliary trough and making it possible for the shelled corn to pass freely down the auxiliary trough to the discharge end thereof.

What I claim as my invention is—

1. In a corn-husking machine, the combination of a frame, husking-rollers mounted therein, a main trough beneath the rollers and adapted to receive the stalks and husks which pass between the rollers, said trough provided in its bottom with an elongated slot which slot gradually widens toward the discharge end of the trough, and an auxiliary trough beneath the main trough and lengthwise of the slot of said main trough, and extending only part of the length of the main trough.

2. In a corn-husking machine, the combination of a frame, husking-rollers mounted therein, a fan-casing, a main trough beneath the rollers and adapted to receive the stalks and husks which pass between the rollers, and having its discharge end in communication with the fan-casing, said trough provided in its bottom with an elongated slot, and an auxiliary trough beneath the main trough and lengthwise of the slot of said main trough, and having its discharge end in advance of the fan-casing and out of communication therewith.

In testimony whereof I affix my signature in presence of two witnesses.

AUGUST ROSENTHAL.

Witnesses:
  A. L. MORSELL,
  ANNA V. FAUST.